Dec. 7, 1937.  E. G. SIMPSON ET AL  2,101,350
SEAT ADJUSTER
Filed May 28, 1936  2 Sheets-Sheet 1
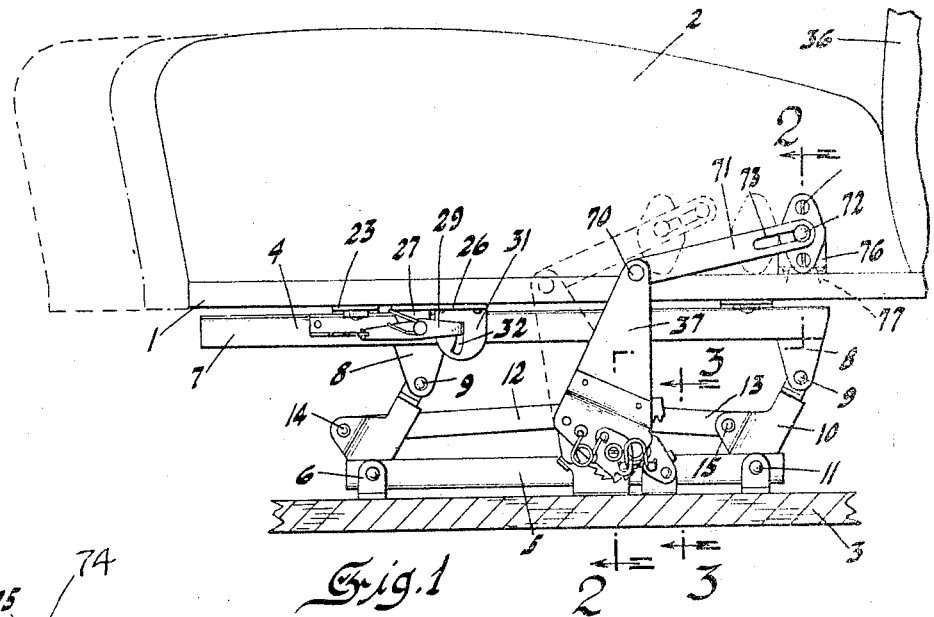
INVENTORS
Emory Glenn Simpson &
Andrew Christian Andersen
BY
Barnes, Kisselle, Laughlin & Raisch
ATTORNEYS

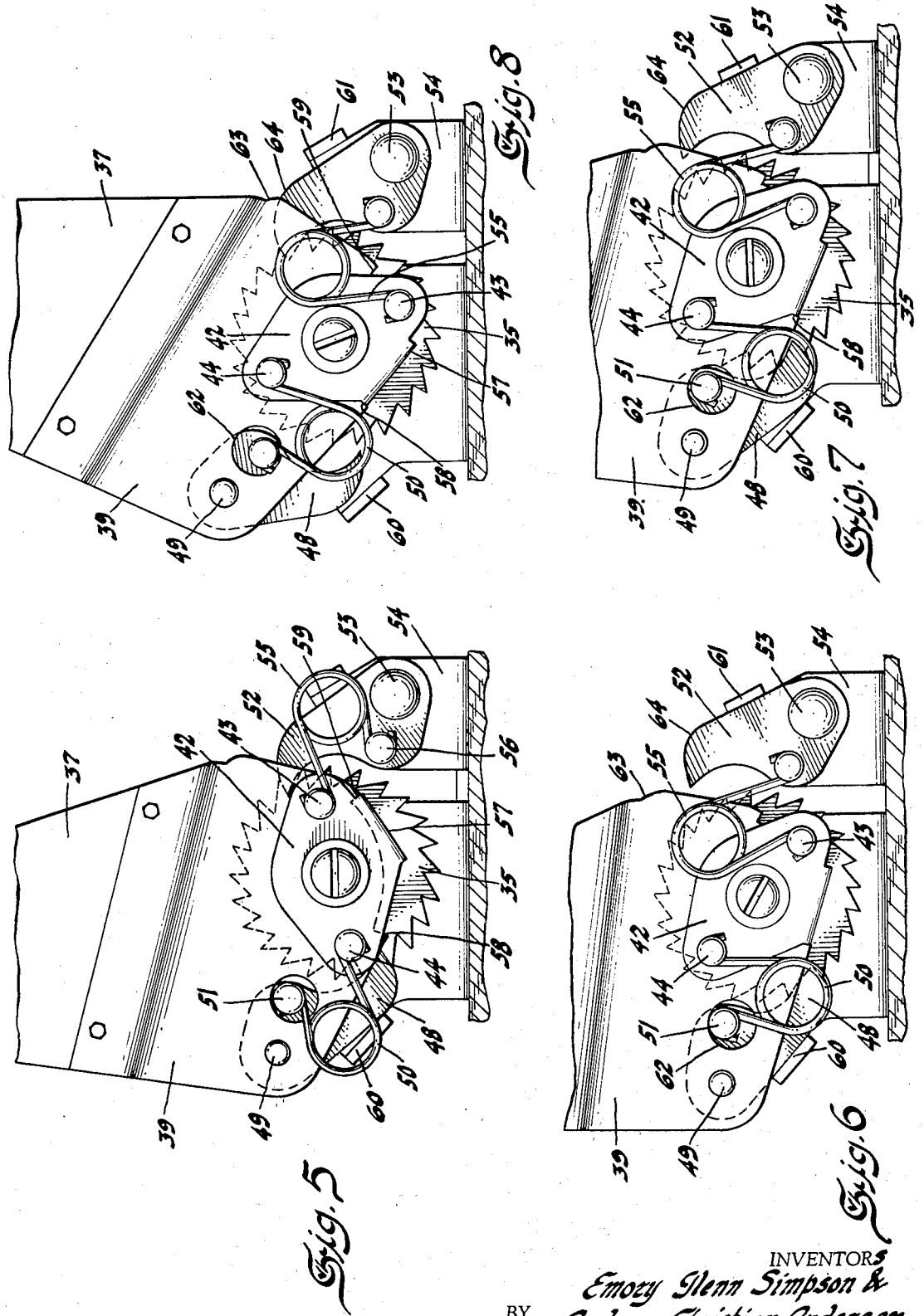

Patented Dec. 7, 1937

2,101,350

UNITED STATES PATENT OFFICE 2,101,350

SEAT ADJUSTER

Emory Glenn Simpson and Andrew Christian Andersen, Detroit, Mich., assignors to Ternstedt Manufacturing Company, Detroit, Mich., a corporation of Michigan Application May 28, 1936, Serial No. 82,286

15 Claims. (Cl. 155—88)

This invention relates to a seat adjuster for an automotive vehicle.

It is an object of this invention to produce a seat adjuster which can be easily raised and lowered either by one who is occupying the seat during the raising and the lowering or by one who is not occupying the seat.

It is also an object of this invention to produce a seat adjuster for raising and lowering a vehicle seat which is compact and efficient in operation.

The invention contemplates a seat adjuster for raising and lowering a seat in which the seat or a portion of the seat can be operated or moved to supply the energy by means of which the seat is raised or lowered.

In the drawings:

Fig. 1 is a side elevation of the seat and adjuster with a dotted line showing how the seat can be slid back and forth to raise or lower the seat.

Fig. 2 is a section along the line 2—2 of Fig. 1.

Fig. 3 is a section along the line 3—3 of Fig. 1.

Fig. 4 is a detail of the latch for latching the seat against sliding movement forwardly and rearwardly.

Figs. 5 through 8 are details of the various positions of the pawl and ratchet mechanism interconnecting the control lever with the rotatable shaft and driving gear.

As stated above, in its broader aspect this invention contemplates the connection of the seat or some shiftable or otherwise movable portion of the seat to a raising and lowering mechanism so that the entire seat or a portion thereof becomes a part of the raising and lowering mechanism and so that the manipulation of the seat or a part thereof co-acts with the raising and lowering mechanism in the raising and lowering of the seat by the occupant or one not occupying the seat. In other words, the invention contemplates a seat adjuster for raising and lowering a seat in which the seat, or a part thereof, which is raised and lowered actually serves as an active element in the combination which effects the raising and lowering.

As shown, the seat comprises a seat bottom cushion 2, a seat frame 1, and a back 36 which may be either pivotally connected or rigidly fixed to the seat frame 1. The seat is arranged to be slid back and forth by the occupant or someone not occupying the seat and is operatively connected to an adjusting mechanism so that fore and aft sliding movement of the seat causes the adjusting mechanism to raise or lower the seat.

The particular type of seat adjuster with which the fore and aft slidable seat is operatively connected is identical with the principal form of the seat adjuster shown in Figs. 1 through 11 of the copending application of Emory Glenn Simpson and Andrew Christian Andersen, filed May 27, 1936, Serial No. 82,054, covering a seat adjuster.

This seat adjuster is as follows: The seat is supported on the floor 3 of the vehicle body by a pair of parallelogram supports generally designated 4, one of which is positioned fore and aft of the vehicle body adjacent one side of the seat and the other adjacent the other side of the seat. Since both of these parallelogram supports are the same only one will be described. Each parallelogram support comprises a bottom rail 5 of channel section which is fixed to the floor by means of the L brackets 6 and an upper rail 7 of channel section. The top rail is pivotally supported adjacent each end on the bottom rail by a pair of levers 10 and thus the top and bottom rails 7 and 5 are at all times parallel. The top rail 7 has fixed at each end a depending U shaped bracket 8. Each bracket 8 is pivotally connected as at 9 to a lever 10 which in turn is pivotally connected to the bottom rail 5 as at 11.

A pair of draft links in the form of rack bars 12 and 13 connect the levers 10. The rack 12 has one end pivotally connected to one of the levers 10 as at 14 and the other rack 13 has one of its ends connected to the other lever 10 as at 15. Racks 12 and 13 mesh with driving gear 16 fixed upon the driving shaft 17. The driving shaft 17 is journaled in the support brackets 18, 19, and 20 which are fixed to the floor 3 of the vehicle body. The racks 12 and 13 are held in mesh with the gear 16 by the inverted U shaped tie-down bracket 21 which is fixed in the bottom rail 5 as at 22.

The seat bottom 1 has bolted or otherwise secured thereto the plates 23, each of which has riveted or otherwise fixed thereto a headed pin 24. These pins 24 slidably interengage the top rails 7 in the elongated slots 25 to permit fore and aft sliding adjustment of the seat along the top rails 7.

The seat frame 1 has fixed thereto a plate 26 having a depending flange 27. A pawl 28 having a finger piece 29 is supported by means of a pivot pin 30 upon flange 27. The plate 26 is also provided with a flange 31 having a slot 32 through which the pawl 28 projects and swings. A rack 33 is fixed to the depending side wall of the top rail 7 and is arranged to be interengaged by the pawl 28 to latch the seat against fore and aft adjustment along the top rails 7.

The vertical upwardly and downwardly adjustment of the seat is effected by means of a pawl and ratchet mechanism. The driving shaft 17 has a flattened end portion 34 upon which is fixed the ratchet 35. A bifurcated lever 37 having the furcations 38 and 39 is rotatably mounted upon cylindrical portions of the shaft 17 as at 40 and 41. A shifter plate 42 having the finger pieces 43 and 44 is also rotatably mounted upon the cylindrical end portion 45 of the shaft 17. The shifter plate 42, lever 37 and ratchet 35 are all held upon the end of the shaft by means of a washer 46 and screw 47 in the end of the shaft.

The ratchet is operated by a driving pawl 48 pivotally mounted by pin 49 upon the branch 39 of lever 37. An over-center acting type of coil spring 50 has one end interengaged with a pin 51 carried by the pawl 48 and the other end engaged with the pin 44 on shifter plate 42. A dogging pawl 52 is pivotally mounted by means of the pin 53 upon a bracket 54 bolted or otherwise secured to the floor of the vehicle body. An over-center acting type of coil spring 55 has one end secured to the pin 43 on the shifter plate 42 and the other end secured to the pin 56 carried by the pawl 52. The shifter plate 42 is provided with an inwardly turned stop lug 57 which swings between the stops 58 and 59 on the branch 39 of lever 37.

Since the fore and aft sliding of the seat is utilized to raise and lower the seat, the seat must be connected with the adjusting mechanism. To this end the upper end of the lever 37 is pivotally connected as at 70 with a link 71. The link 71 has a lost motion connection with the seat (1, 2, 36). This lost motion connection takes the form of a pin 72 fixed to a plate 74 which is secured by screws 75 to an L-bracket 76 which in turn is secured to the seat frame 1 by the screws 77. The pin 72 passes through, and slidably interengages the link 71 in the elongated slot 73.

The operation of the device is as follows: When the seat is in lowered position and it is desired to raise the seat the shifter plate 42 is either in, or shifted to, the position shown in Fig. 5 so that the stop lug 57 abuts the stop 59. At this time the over-center springs 50 and 55 urge both pawls 48 and 52 into interengagement with the teeth of the ratchet 35. If the seat 2 and frame 1 are now slid (the latch 28 first being released) to their rearmost position or to the right as shown in Fig. 1, the pawl 48 will simply move clockwise about the ratchet 35 which is dogged against clockwise movement by the pawl 52. When the seat 1 reaches the end of its rearward movement, due to the headed pin 24 striking the end of the slot 25, the pin 72 will engage the link 71 at the right hand end of the slot 73. The rearward movement of the seat is also arrested by the cam portion 63 of the lever 37 camming the pawl 52 into engagement with the ratchet 35. The occupant of the seat, or one not occupying the seat, now slides the seat forwardly along the rails 7. During the initial forward movement the pin 72 slides in the slot 73. This lost motion pin and slot connection between the seat 1 and the link 71 gives the operator what may be termed a running start in elevating the seat, that is, he gets the seat pretty well under forward motion before the pin engages the left hand end of the slot 73 and picks up the link 71 which in its forward movement throws the lever 37 forwardly and downwardly or counter-clockwise as viewed in Fig. 1. This counter-clockwise movement of the lever, as shown in Fig 5, causes the ratchet 35 to rotate counter-clockwise. The counter-clockwise movement of the ratchet 35 rotates the shaft 17 and gear 16, which through the rack bars 12 and 13 and levers 10 elevates the seat. The operator now again slidably shifts the seat rearwardly and repeats the back and forth sliding movement of the seat to elevate the seat.

To lower the seat the shifter plate 42 is swung clockwise to the position shown in Figs. 6, 7, and 8, with the stop lug 57 abutting the stop 58 on branch 39 of lever 37. At this time the over-center springs urge both the pawls 48 and 52 away from the ratchet 35. Spring 55 yieldably holds the pawl 52 against the stop lug 61 on the bracket 54 and spring 50, when the pawl 48 clears lug 60 (Fig. 8), yieldably holds the pin 51, carried by the pawl 48, against the circumference of the circular opening 62 in the branch 39 of lever 37 which arrests the movement of the pawl 48 away from the ratchet 35. If the seat 1 is slid to its rearmost position or to the right, as viewed in Fig. 1, the portion 63 of the lever 37, which overhangs the pawl 52, will engage the face 64 of the pawl and cam it inwardly into engagement with the ratchet to prevent clockwise movement of the ratchet and consequently prevent lowering of the seat. If the seat is now slid forwardly or to the left, as viewed in Fig. 1, the pin, acting through link 71, will swing the lever arm 37 to the left or downwardly. During this downward or counter-clockwise movement of the lever 37, as viewed in Fig. 7, the pawl 48 will engage the lug 60 which cams it into engagement with the ratchet 35. Further downward movement of the lever 37 turns the ratchet 35 and permits pawl 52 to snap out of engagement with the ratchet, as shown in Fig. 6, because the part 63 of the lever 37 is now swung out of engagement with the pawl 52. The operator now slides the seat rearwardly which, through link 71, lever 37, pawl 48, ratchet 35, shaft 17, racks 12 and 13, and levers 10, controls the downward movement of the seat. The weight of the seat or the combined weight of the seat and the occupant, controlled by the rearward sliding of the seat, acts through the adjusting mechanism as above described to lower the seat. However, as the seat approaches the end of its rearward sliding movement, the cam 63 again engages the pawl 52 and cams it into engagement with the ratchet 35 to arrest further rotation of the ratchet and further downward movement of the seat until the seat is again slid forwardly to rotate the lever 37 counter-clockwise, as viewed in Figs. 6, 7, and 8, to release pawl 52 and again repeat a downward step in the lowering of the seat.

It will be noted that the seat adjuster above described permits the seat to be slidably adjusted forwardly or rearwardly through almost any desirable range without raising or lowering the seat. For example, the slot 73 can be lengthened to increase the fore and aft sliding adjustment of the seat without raising or lowering the same, or the slot can be shortened to decrease the range of fore and aft adjustability of the seat. When the pawl 48 is in the position shown in Fig. 5, the seat in its rearward movement merely causes the pawl 48 to ride along the ratchet 35 and of course does not raise or lower the seat. When the shifter plate 42 is shifted to place the pawl and ratchet mechanism in position for lowering the seat, the seat can be shifted back and forth through quite a considerable range without lowering the seat, for example, the seat can be shifted forwardly to a position where the pawl 48 is just cammed into engagement with the ratchet 35 by the lug 60 so that the pawl 52 remains engaged with the ratchet. The seat can then be slid rearwardly to the end of the stroke and latched in any intermediate position without lowering the seat. Thus, when it is desired to adjust the seat forwardly and rearwardly only without raising or lowering it, the seat by proper manipulation can be adjusted through a considerable range forwardly or rearwardly and latched in any desired position by latch 28.

We claim:

1. In combination, a seat, an extensible support for the seat adapted to be extended to raise the seat, operative connections between the seat, and the extensible support for reciprocably mounting the seat on the extensible support, and means operatively connected to the said extensible support including the seat whereby relative reciprocating movement between the seat and the extensible support extends the support and raises the seat.

2. In combination a seat, an extensible support for the seat adapted to be extended to raise the seat, slidable operative connections between the seat and the extensible support slidably mounting the seat on the extensible support, elevating means for the said extensible support including operative connections between the said elevating means and the slidable seat whereby the seat can be elevated by sliding the seat along its support.

3. In combination a seat, an extensible support for the seat adapted to be extended to raise the seat and collapsed to lower the seat, operative connections between the seat and the extensible support for reciprocably mounting the seat on the extensible support, elevating mechanism operatively connected to the said extensible support including connections between the seat and the elevating mechanism, and a shiftable control for said elevating mechanism shiftable to one position whereby reciprocatory movement of the seat operates the elevating mechanism to extend the said support and raise the seat and shiftable to another position whereby the reciprocatory movement of the seat operates the elevating mechanism to collapse the extensible support and lower the seat.

4. In combination a seat, an extensible support for the seat adapted to be extended to raise the seat and collapsed to lower the seat, operative connections between the seat and the extensible support for reciprocably mounting the seat on the extensible support, a rotatable shaft, driving connections between the rotatable shaft and the extensible support, driving connections between the rotatable shaft and the said seat whereby reciprocation of the seat rotates the shaft to extend the support and raise the seat.

5. In combination a seat, an extensible support for the seat adapted to be extended to raise the seat and collapsed to lower the seat, operative connections between the seat and the extensible support for reciprocably mounting the seat on the extensible support, a rotatable shaft, driving connections between the rotatable shaft and the extensible support, driving connections between the rotatable shaft and the said seat, a shiftable control for the said shaft shiftable into one position whereby reciprocatory movement of the seat rotates the shaft in one direction to extend the support and raise the seat and shiftable into another position whereby reciprocatory movement of the seat rotates the shaft in the opposite direction to collapse the extensible support and lower the seat.

6. In combination a seat, an extensible support for the seat adapted to be extended to raise the seat and collapsed to lower the seat, operative connections between the seat and the extensible support for reciprocably mounting the seat on the extensible support, a rotatable shaft, a gear fixed on the said shaft, a rack bar meshed with the said gear and operatively connected with the said extensible support, and driving connections between the rotatable shaft and the said seat whereby reciprocation of the seat rotates the shaft to extend the support and raise the seat.

7. In combination a seat, an extensible support for the seat adapted to be extended to raise the seat and collapsed to lower the seat, operative connections between the seat and the extensible support for reciprocably mounting the seat on the extensible support, a rotatable shaft, a gear fixed on the said shaft, a rack bar meshed with the said gear and operatively connected with the said extensible support, driving connections between the rotatable shaft and the said seat, a shiftable control for the said shaft shiftable into one position whereby reciprocatory movement of the seat rotates the shaft in one direction to extend the support and raise the seat and shiftable into another position whereby reciprocatory movement of the seat rotates the shaft in the opposite direction to collapse the extensible support and lower the seat.

8. In combination a seat, an extensible support for the seat adapted to be extended to raise the seat and collapsed to lower the seat, operative connections between the seat and the extensible support for reciprocably mounting the seat on the extensible support, a rotatable shaft, a gear fixed on the said shaft, a rack bar meshed with the said gear and operatively connected with the said extensible support, operative connections including a pawl and ratchet between the reciprocatory seat and the said shaft, a shiftable control means for the said pawl and ratchet shiftable into one position whereby reciprocatory movement of the seat rotates the shaft in one direction to extend the support and raise the seat and shiftable into another position whereby reciprocatory movement of the seat rotates the shaft in the opposite direction to collapse the extensible support and lower the seat.

9. In an automotive vehicle body, a seat, an extensible support for the seat comprising a pair of rails spaced laterally of the seat bottom and extending fore and aft of the seat, a pair of parallel levers for each rail spaced lengthwise of the rail and each of which is pivotally connected at one end to the rail and at the other end to the floor of the vehicle body, operative connections between the seat and the said support rails for reciprocably mounting the seat on the extensible support, a rotatable shaft extending laterally of the seat between the seat and the floor, a gear fixed on the shaft, a rack bar meshed with the said gear and pivotally connected with one or more of the said parallel support levers, a lever freely rotatably mounted upon the said shaft, a pawl and ratchet clutch mounted between the said lever and shaft for interconnecting the shaft and the said lever, a link connecting the seat with the said lever whereby reciprocatory motion of the said seat is transmitted by the said link to the said lever to raise or lower the said seat.

10. In an automotive vehicle body, a seat, an extensible support for the seat comprising a pair of rails spaced laterally of the seat bottom and extending fore and aft of the seat, a pair of parallel levers for each rail spaced lengthwise of the rail and each of which is pivotally connected at one end to the rail and at the other end to the floor of the vehicle body, operative connections between the seat and the said support rails for reciprocably mounting the seat on the extensible support, a rotatable shaft extending laterally of the seat between the seat and the floor, a gear fixed on the shaft, a rack bar meshed with the said gear and pivotally connected with one or more of the said parallel support levers, a lever freely rotatably mounted upon the said shaft, a pawl and ratchet clutch mounted between the said lever and shaft for interconnecting the shaft and the said lever, and a link having operative connections with the seat and with the said lever, one of said operative connections having a lost motion connection, whereby reciprocatory motion of the said seat is transmitted by the said link to the said lever to raise or lower the said seat.

11. In an automotive vehicle body, a seat, an extensible support for the seat comprising a pair of rails spaced laterally of the seat bottom and extending fore and aft of the seat, a pair of parallel levers for each rail spaced lengthwise of the rail and each of which is pivotally connected at one end to the rail and at the other end to the floor of the vehicle body, operative connections between the seat and the said support rails for reciprocably mounting the seat on the extensible support, a rotatable shaft extending laterally of the seat between the seat and the floor, a gear fixed on the shaft, a rack bar meshed with the said gear and pivotally connected with one or more of the said parallel support levers, a lever freely rotatably mounted upon the said shaft, a pawl and ratchet clutch mounted between the said lever and shaft for interconnecting the shaft and the said lever, a link connecting the seat with the said lever whereby reciprocatory motion of the said seat is transmitted by the said link to the said lever to raise or lower the said seat, a shiftable control means for the said pawl and ratchet shiftable into one position whereby reciprocatory movement of the seat rotates the shaft in one direction to extend the support and raise the seat and shiftable into another position whereby reciprocatory movement of the seat rotates the shaft in the opposite direction to collapse the extensible support and lower the seat.

12. In an automotive vehicle body, a seat, an extensible support for the seat comprising a pair of rails spaced laterally of the seat bottom and extending fore and aft of the seat, a pair of parallel levers for each rail spaced lengthwise of the rail and each of which is pivotally connected at one end to the rail and at the other end to the floor of the vehicle body, operative connections between the seat and the said support rails for reciprocably mounting the seat on the extensible support, a rotatable shaft extending laterally of the seat between the seat and the floor, a gear fixed on the shaft, a rack bar meshed with the said gear and pivotally connected with one or more of the said parallel support levers, a lever freely rotatably mounted upon the said shaft, a pawl and ratchet clutch mounted between the said lever and shaft for interconnecting the shaft and the said lever, and a link having operative connections with the seat and with the said lever, one of said operative connections having a lost motion connection whereby reciprocatory motion of the said seat is transmitted by the said link to the said lever to raise or lower the said seat, a shiftable control means for the said pawl and ratchet shiftable into one position whereby reciprocatory movement of the seat rotates the shaft in one direction to extend the support and raise the seat and shiftable into another position whereby reciprocatory movement of the seat rotates the shaft in the opposite direction to collapse the extensible support and lower the seat.

13. In combination a seat, an extensible support for the seat adapted to be extended to raise the seat and collapsed to lower the seat, operative connections between the seat and the extensible support for reciprocably mounting the seat on the extensible support, a rotatable shaft, a gear fixed on the said shaft, a rack bar meshed with the said gear and operatively connected with the said extensible support, operative connections including a pawl and ratchet between the reciprocatory seat and the said shaft, a shiftable control means for the said pawl and ratchet shiftable into one position whereby reciprocatory movement of the seat rotates the shaft in one direction to extend the support and raise the seat and shiftable into another position whereby reciprocatory movement of the seat rotates the shaft in the opposite direction to collapse the extensible support and lower the seat, and a latch for latching the seat to the said support to prevent relative reciprocating movement between the seat and the extensible support.

14. In combination a seat, an extensible support for the seat adapted to be extended to raise the seat and collapsed to lower the seat, operative connections between the seat and the support for shiftably mounting the seat on the support, elevating mechanism operatively connected to the said extensible support including operative connections with the said shiftable seat whereby the shifting of the seat upon its support in one direction actuates the elevating mechanism to vertically adjust the seat, and a latch for holding the support in the thus extended position whereby the seat can be shifted in the opposite direction without operating the elevating mechanism.

15. In combination a seat, an extensible support for the seat adapted to be extended to raise the seat and collapsed to lower the seat, operative connections between the seat and the support for shiftably mounting the seat forwardly and rearwardly along the support, elevating mechanism operatively connected to the said extensible support including operative connections with the said shiftable seat whereby the shifting of the seat upon its support in one direction actuates the elevating mechanism to vertically adjust the seat, a latch for holding the support in the thus extended position whereby the seat can be shifted along the support in the opposite direction without operating the elevating mechanism, and a latch for latching the seat against shifting along the seat support.

EMORY GLENN SIMPSON.
ANDREW CHRISTIAN ANDERSEN.